United States Patent [19]
Hayden

[11] Patent Number: 6,057,922
[45] Date of Patent: May 2, 2000

[54] OPTICAL TESTING METHOD AND APPARATUS EMPLOYING A DISTORTION VERIFICATION GRID

[75] Inventor: Joseph E. Hayden, Spencerport, N.Y.

[73] Assignee: Eastman Kodak Company, Rochester, N.Y.

[21] Appl. No.: 09/300,830

[22] Filed: Apr. 27, 1999

[51] Int. Cl.⁷ .................................................. G01B 9/02
[52] U.S. Cl. ........................ 356/359; 356/360; 356/348
[58] Field of Search .................................... 356/359, 360, 356/348

[56] References Cited

U.S. PATENT DOCUMENTS

| | | |
|---|---|---|
| 3,064,519 | 11/1962 | Shelton, Jr. . |
| 3,858,981 | 1/1975 | Jaerisch et al. . |
| 3,870,414 | 3/1975 | Duffy . |
| 4,498,770 | 2/1985 | Corwin et al. . |
| 4,624,569 | 11/1986 | Kjwon . |
| 4,832,489 | 5/1989 | Wyant et al. . |
| 5,220,406 | 6/1993 | Kishner . |
| 5,459,576 | 10/1995 | Brunfeld et al. . |
| 5,568,256 | 10/1996 | Korner et al. . |
| 5,706,086 | 1/1998 | LaFleur . |
| 5,737,079 | 4/1998 | Burge et al. ............................ 356/348 |

*Primary Examiner*—Robert H. Kim
*Assistant Examiner*—Philip Natividad
*Attorney, Agent, or Firm*—Thomas H. Close

[57] ABSTRACT

A method and apparatus for testing the configuration of an optical element includes an optical test-set having a holographic optical element designed to obtain a null wave front at the surface of an optical element under test; an interferometer for viewing the test-set, the optical test set and interferometer having optical distortions; and a distortion verification grid (DVG) located in the optical test-set, the DVG comprising a thin opaque sheet of material having a predistorted array of asymmetric holes arranged such that the image of the array of holes formed by the interferometer will be regular and the images of the holes will be symmetric when the optical distortions have been correctly understood and accounted for in the design of the DVG and the distortion correction function.

6 Claims, 3 Drawing Sheets

OPTICAL TESTING METHOD AND APPARATUS EMPLOYING A DISTORTION VERIFICATION GRID

This invention was made with Government support under contract number 2493 for the Department of Defense. The Government has certain rights in this invention.

FIELD OF THE INVENTION

The present invention relates to the field of optical testing, and in particular to test equipment used to measure the surface configuration of a reflective or refractive optical element to fractions of a wavelength of light.

BACKGROUND OF THE INVENTION

Mirrors, lenses, and other optical components are used in a variety of demanding applications ranging from space telescopes to laser systems. Such systems require optical components with very accurate surface configurations. Even slight deviations from the desired surface configuration can cause severe degradation in system performance, which may not be recognized until the system is deployed. A well known and unfortunately costly example of a lens system having unwanted deviations from the desired configuration is the Hubbell Space Telescope.

Currently, interferometers are used with optical test-sets to measure the surface of an optical element to fractions of a wavelength. A test-set generally includes the optical element being tested together with a holographic optical element (HOE) that has been designed to obtain a null wave front (i.e. no fringes, or very few fringes, in the interferogram obtained by testing with normal incidence light at the optical surface under test). Test-sets designed for testing large highly aspheric optics commonly contain a significant amount of optical distortion. Usually, a commercial interferometer is used with a test-set. Both the interferometer and the test-set can potentially contribute to the distortion. However, since commercial interferometer vendors do not provide the optical prescription of the interferometer for proprietary reasons, the optical distortion of the interferometer cannot be modeled. (As a rule of thumb, the steeper the optical element being tested, the more distortion that will be created since the HOE or lens must do more work by diffracting the rays to make them normal to the optical surface at all points).

Even a perfect optical system with a perfect test optical element can still have distortion. There are two forms of distortion that one may encounter with optical testing: optical distortion and geometric perspective distortion. Optical distortion occurs because the rays of light enter the HOE with one trajectory but leave the HOE with another. The HOE diffractively redirects the incident light so that it will be normal to the ideal optical surface under test, thus guaranteeing that the light will return on itself to the interferometer. The change in trajectory of the light after the HOE, or lens, distorts the image of the test optical element.

Geometric perspective distortion is typically created in the data processing when the data is intentionally transformed or distorted to convert to another geometric perspective. This is like transforming the X, Y, and Z coordinates of an object, commonly seen in image processing programs, to view the object from another angle. One case where a perspective change in the data is required is when the surface data is measured with the incident light normal to the surface everywhere but the polishing machine removes material in the Z-direction only (i.e. roughly normal to the flat back surface of the mirror) and does not have the capability to remove material normal to the optical surface. It is possible that the test-set will be responsible for contributing to the geometric distortion in cases where the test-optic is not being tested with normal incidence light, such as an elliptical or hyperbolic surface. The result of geometric distortion is that the image of the optical element being tested will look spatially distorted relative to the actual optical element. Failure to understand and correct for this distortion will result in a poor convergence of the testing and polishing cycles for the optical element. In the case of severe distortion, it is possible that the optical testing and polishing process will never converge and it will not be possible to complete the optical element to specification.

In order to understand and correct for the optical distortion of the test-set, present practice involves removing the optical element being tested from the test-set and applying an array of four paint spots (i.e. fiducial markings) onto the surface of the optical element using the metal probe of a coordinate measuring machine. The fiducials are placed in the form of a rectangle, a square, or a diamond, depending on the shape and orientation of the optical element. The fiducials are usually placed near the edge of the optical element. The coordinate measuring machine (CMM) uses a spring-loaded, ruby-tipped probe that is dipped in a 50/50 mixture of type correcting fluid (e.g. Whiteout™) and water to place the temporary marks on the optical element. The optical element is then replaced in the test-set and the pattern of marks is observed at the interferometer. The observed surface data is distortion corrected using a nonlinear Cartesian or radial polynomial. The imaged fiducials that appear on the surface map are used to establish spatial correspondence between the data and its coordinate system before applying the distortion correction function.

Creating the distortion correction function is a logical and systematic procedure but involves several detailed steps. The location of the fiducials are determined by performing a linear transformation of the data onto the desired coordinate system. Linear transformations allow rotation, scaling, and offset (distortion is considered a nonlinear transformation). Although it is possible to correct the distortion of an image of the test optic with software based on the locations of the four fiducials, no unique conclusions can be made about the accuracy of the applied distortion correction. The imaged locations of the four fiducials do not provide enough information for visual feedback or enough information for a mathematical analysis. The raw surface data initially acquired by the interferometer must go through between 2 and 4 linear and nonlinear transformations before it is fully distortion corrected and ready to be used as hit-map to polish an optic. A hit-map is the term used for the final distortion corrected test-set data that is provided to a polishing machine (i.e. small tool polisher or ionfigure machine). The polishing machine then converts the XYZ data to specific machine instructions to control various parameters in the polishing process. The design and application of these transformations are complex and prone to error. A person looking at a distortion corrected image has no way to either visually or mathematically confirm the validity of these transformations based on the surface data or the 4 fiducials other that to say "yes, it looks like the data has been spatially warped".

This fiducial application process is time consuming and therefore costly, and the repeated handling of the optical element under test poses the risk of damaging a highly expensive optical element. There is a need therefore for an improved method and apparatus for testing an optical element that avoids the shortcomings of the prior art technique.

SUMMARY OF THE INVENTION

The need is met according to the present invention by a method and apparatus for testing the configuration of an optical element that includes an optical test-set having a holographic optical element designed to obtain a null wave front at the surface of an optical element under test; an interferometer for viewing the test-set, the interferometer and optical test set having optical distortions; and a distortion verification grid (DVG) located in the optical test-set, the DVG comprising a thin opaque sheet of material having a pre-distorted array of asymmetrically-shaped holes arranged such that the image of the array of holes formed by the interferometer will be regular and the images of the holes will be symmetric when the optical distortions have been correctly understood and accounted for in the design of the DVG and the distortion correction function. It is possible to design a DVG so that the pattern will look regular at any step in the distortion correction process.

ADVANTAGES

The method and apparatus of the present invention have the following advantages:

1. When used in conjunction with distortion correction software, a DVG can be designed to produce a regularly gridded array of light holes at any given stage of the distortion correction process to provide immediate visual confirmation that all distortion correction calculations were performed correctly.

2. Once a DVG is produced, it can be used in a given test-set to characterize the distortion of other identical optical elements.

3. There is no longer a need to remove the optical element from the test-set, or to place a grid of spots on the optical element being tested.

4. The DVG can be easily inserted or removed from the optical test-set using a kinematic mount.

5. The DVG can be used to empirically characterize and separate the component of distortion in a commercial interferometer from that of the optical test-set.

DETAILED DESCRIPTION OF THE INVENTION

Figure 1:
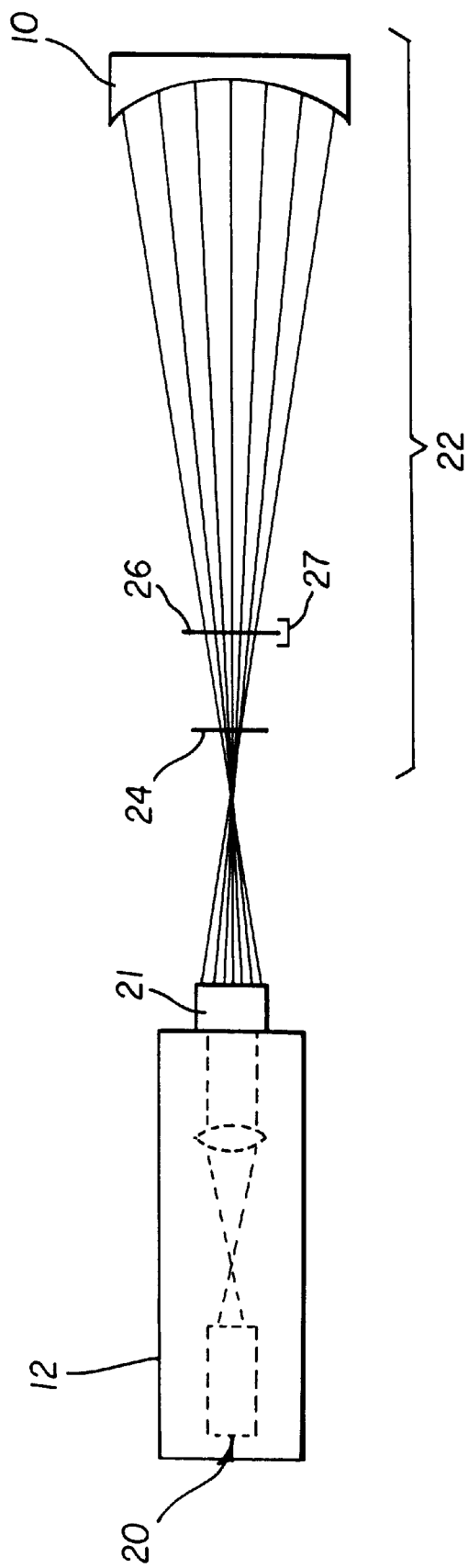
FIG. 1 is a schematic diagram of an optical testing apparatus according to the present invention.

Referring to FIG. 1, a typical test configuration for testing a large optical element 10 is shown. The test configuration includes an interferometer 12, such as a commercial interferometer available from any one of a number of suppliers of scientific instruments. Examples include: the Zygo Mark IV Interferometer available from Zygo, Inc. Danbury, Conn.; The Mini-Fiz Interferometer, available from Phase Shift Tech, Tucson, Ariz.; or the WYKO interferometer available from WYKO, Inc., Tucson, Ariz.

The interferometer generally includes a Helium-Neon laser light source (not shown), and a CCD camera 20 for observing the interference pattern created by the interferometer, an objective 21 for shaping the beam as it exits and enters the interferometer (front of interferometer). Other standard interferometer optics not shown include flat mirrors, spatial filters, polarizing beam-splitter cubes, and various lenses. The test configuration also includes a test-set 22 comprising a holographic optical element (HOE) 24 and the optical element being tested 10. The HOE 24 is produced in a known way using optical modeling software, such as Code V available from Optical Research Associates in Pasadena, Calif. The HOE 24 is designed to produce a null wavefront at the surface of the optical element, when the optical element has the desired surface configuration, whereby the interference pattern produced by the interferometer will show irregularities when an optical element under test deviates from the desired configuration.

It is assumed in the Code V model that the interferometer will have no contribution to the distortion. The image of the DVG will not appear regular if the interferometer imparts a distortion on the return beam. Any irregularity in the image of the DVG as seen by the interferometer can be attributed to distortion imparted by the interferometer. This assumes, of course, that all other sources of error have been eliminated. It is unlikely, however, that the interferometer will contribute significantly to the distortion when the test-set is used in a null configuration. Interferometer distortion is most likely to occur when the test-set is used in a non-null configuration, that is, when an HOE 24 is not used when testing an asphere. This will cause more dramatic departures in the trajectory of the return beam sending it through the interferometer in unpredictable ways making it more prone to distort the beam.

A distortion verification grid (DVG) 26 according to the present invention is located in the test-set 22 at a point 2 inches from the HOE 24 and before the test-optical element. Placing the DVG 26 after the HOE 24 guarantees that light will come back through the holes. Again, the HOE 24 redirects the rays to force all of the rays to be normal to the test-mirror. If each ray is not normal to the surface where it is contacting, it will not return to the hole on the DVG 26 from which it originated. The actual location of the DVG 26 between the HOE 24 and the test-optical element does not matter as long as the location of the DVG 26 in the model is consistent with the location of DVG 26 in the test-set. However, the advantage of placing the DVG 26 as close as possible to a focus (i.e. near the HOE 24) is that the DVG 26 can be made smaller to minimize the manufacturing and mounting costs of the DVG grid. The DVG is located in the optical test set using a kinematic mount 27, so that it can be removed and replaced in the test set in exactly the same position.

Figure 2:
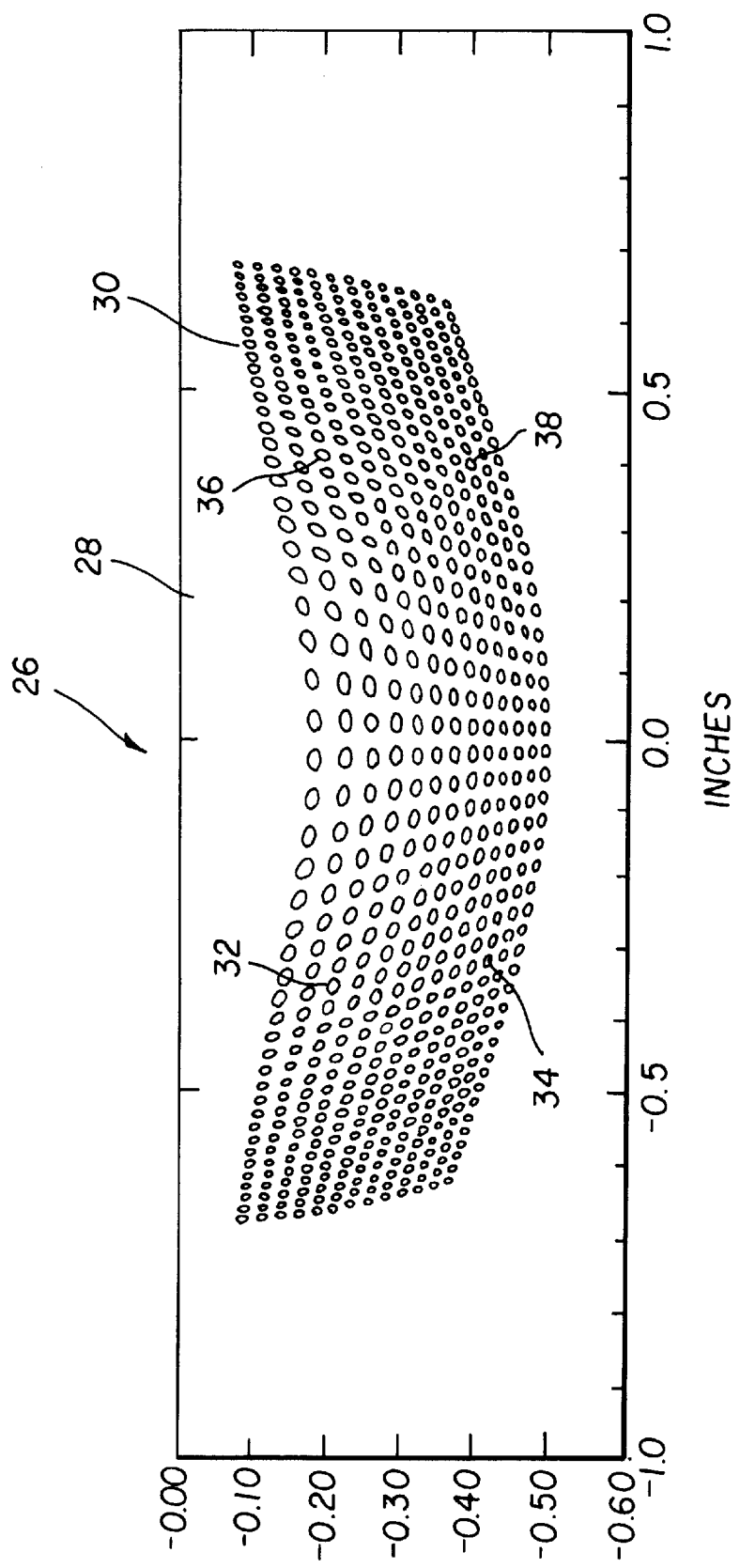
FIG. 2 is a diagram showing a distortion verification grid (DVG) according to the present invention.
Figure 3:
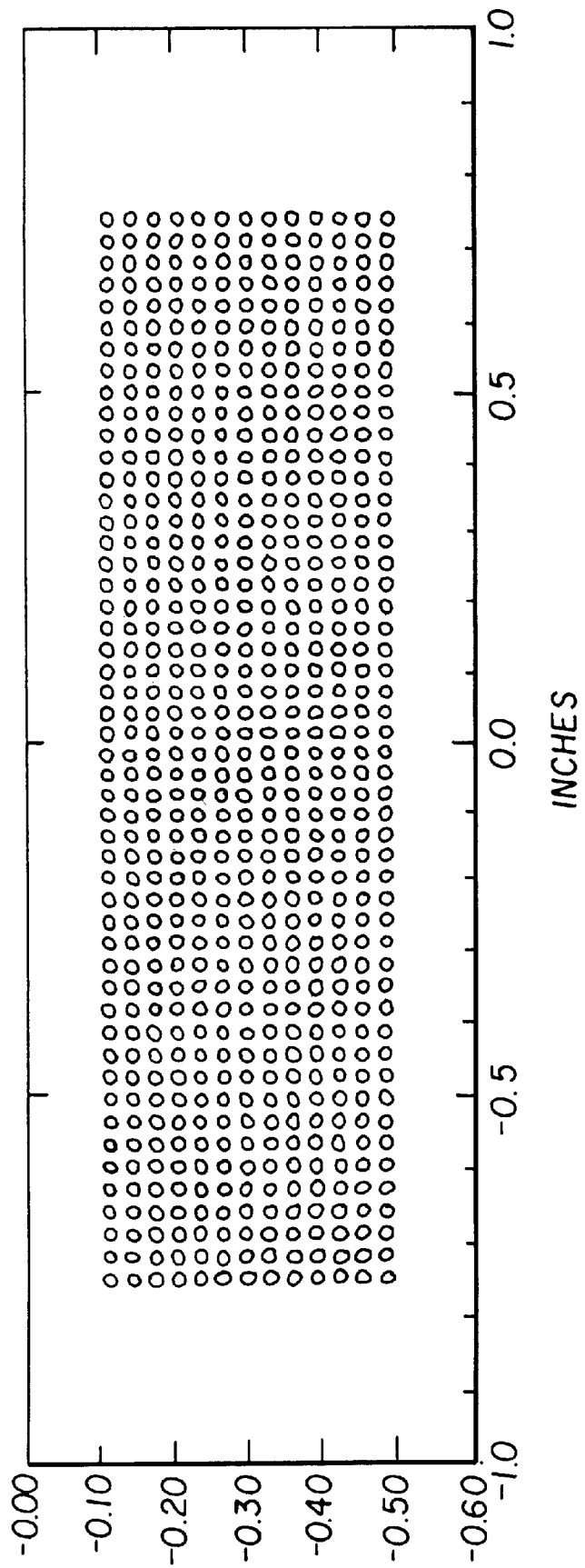
FIG. 3 is a diagram showing the image of the DVG when employed in optical testing apparatus of FIG. 1 with an optical element having the desired configuration.

Referring to FIG. 2, the DVG 26 comprises a thin sheet 28 of opaque material, such as metal, having an array of irregularly shaped (i.e. asymmetric) holes 30. The array of holes is distorted from a regular grid pattern, and the individual shapes of the holes are distorted in such a way that when the optical element 10 has the desired configuration, the image of the grid produced at the CCD camera 20 in the interferometer will be a regular array of symmetrically-shaped holes, as shown in FIG. 3. The irregular pattern of distorted holes for the DVG 26 is calculated using the same optical test-set mathematical model that is used to design the HOE 24.

In operation, four fiducials are applied to the optical element under test in the manner of the prior art, but they are used only one time to align the DVG 26 to the test-optic. At least four of the holes 32, 34, 36, and 38 on the DVG 26, call them alignment holes, correspond to the locations of the fiducials on the test-optic. The DVG 26 is aligned in such a way that the image of the four fiducials on the test-optic pass through the four alignment holes on the DVG 26 as viewed by the interferometer. Placement of the fiducials on the test-optic take into consideration the location at which the DVG alignment holes 32–38 will be projected on to the test-optic. This is easily done in a Code V model of the test-set using 4 separate ray traces. The DVG 26 is placed in the test-set 22 and the image produced by camera 22 is observed. The image of the DVG 26 is preferably inspected visually for regularity of pattern and hole geometry, alternatively it can be examined using software. The visual method is the preferred mode of operation for the DVG 26, as no sophisticated software is required.

Software which automatically locates the blobs of light from the imaged DVG can be employed to determine the mathematical relationship between the predicted and measured grids of X, Y coordinates. The X, Y coordinates are compared using a least-squared fit to the expected grid of holes. Any difference between the actual and expected coordinates would indicate that either the DVG 26 or test-set or interferometer are not acting as predicted. When the DVG 26 is used in the test-set, the image of the DVG containing hundreds of holes should look regular to the eye at some particular stage of the data processing. The DVG solves this dilemma by producing a visually regular grid of holes in either the raw data acquired by the interferometer or the data at any successive transformation stage, depending on the stage at which the DVG was designed to look regular. Designing the DVG to look regular at successive steps proves that each of these data transformations were also correct. Again, establishing if the imaged grid of holes is regular is most easily and elegantly done visually, although regularity can also be determined using the right software (with nonlinear transformations many more that 4 points are necessary to perform or verify the transformation). A separate DVG must be used in the test-set, at the same location, for each data processing stage at which a regular looking grid of holes is desired. It should be noted that the surface figure is along the Z-axis and the spatial distortion is along the X- and Y-axes. The grid of holes will look regular long before the desired surface has been achieved. However, if distortion is not accounted for or applied incorrectly the desired surface figure may never be achieved.

Depending on the data transformation step in which the DVG 26 was designed to appear regular. If the distortion correction was incorrect or distortion was introduced by the interferometer then the grid of holes from the imaged DVG 26 will not look regular at any stage of the data processing.

When the image of the DVG arrives at the CCD image plane inside the interferometer it should look regular, if designed as such. If it does not then either 1) the model of the test-set used to generate the DVG is incorrect, or 2) the test-set is not performing as designed, or (3) the interferometer is contributing to the distortion. If (1) and (2) can be eliminated then we can conclude that (3) is responsible. And, we can confidently conclude this using a systematic approach, and perhaps by introducing another complementary test and verification method. A regular grid at the image implies that the DVG 26 was designed with the correct amount of compensating distortion, meaning that the correct model was used, the test-set is performing as designed, and the interferometer has no distortion contribution. Theoretically, it could also mean that none of the above conditions are true but a cancellation effect occurred, but this is highly unlikely.

Usually, there are no modifications made to the test-set or the test-set model provided that the imaged grid looks regular at the appropriate stage of the distortion correction process. However, if the imaged grid of holes looks irregular then this would indicate a discrepancy between the model of the test-set which was used to design the DVG 26 and the actual test-set. The DVG 26 might only be used once or twice to verify that the test-set is producing the expected distortion. If the image of the DVG looks regular then this implies that one has correct knowledge of the distortion that the test-set and perspective changes cause.

According to one mode of practicing the invention, the DVG 26 is designed by generating the pattern of holes using the optical ray tracing program Code V, in a manner similar to that used to generate the holographic optical element 24 and forming a computer automated design (CAD) file.

The DVG is constructed by driving a laser milling machine from the CAD file to form the pattern of holes in 0.010" steel, or by preparing a photolithographic mask using the CAD file, and using the mask to etch the holes in a 0.010" thick sheet of nickel. In the example shown in FIG. 2, the DVG was prepared for a rectangular aspheric optical element. The pattern consists of 650 octagonal holes in a 2"×0.6" plate.

The invention has been described in detail with particular reference to certain preferred embodiments thereof, but it will be understood that variations and modifications can be effected within the spirit and scope of the invention.

PARTS LIST 10 optical element being tested
12 interferometer
20 CCD camera
21 lens
22 test-set
24 holographic optical element
26 distortion verification grid
27 kinematic support
28 opaque sheet
30 array of holes
32 alignment hole
34 alignment hole
36 alignment hole
38 alignment hole

What is claimed is:

1. A method of testing an optical element, comprising the steps of:

a) providing an optical test-set including a holographic optical element designed to obtain a null wave front at the surface of an optical element under test;

b) providing an interferometer for viewing the test-set, the interferometer and optical test set having optical distortions;

c) locating a distortion verification grid (DVG) in the optical test-set, the DVG comprising an opaque sheet of material having a pre-distorted array of asymmetric holes arranged such that the image of the array of holes formed by the interferometer will be regular and the images of holes will be symmetric when the optical distortions have been correctly understood and accounted for in the design of the DVG and the distortion correction function.

2. The method of testing an optical element claimed in claim 1, wherein the DVG is a 0.010" thick sheet of metal having an array of hexagonal holes.

3. The method of testing an optical element claimed in claim 1, further comprising the steps of:
   a) applying four spots to the surface of the optical element, the four spots corresponding to four predetermined holes in the DVG; and
   b) aligning the DVG in the optical test set by aligning the image of the four spots with the predetermined holes.

4. Apparatus for testing the configuration of an optical element, comprising:
   a) an optical test-set including a holographic optical element designed to obtain a null wave front at the surface of an optical element under test;
   b) an interferometer for viewing the test-set, the interferometer and optical test set having optical distortions;
   c) a distortion verification grid (DVG) located in the optical test-set, the DVG comprising an opaque sheet of material having a pre-distorted array of holes arranged such that the image of the array of holes formed by the interferometer will be regular when the optical distortions are correctly understood and accounted for in the design of the DVG and the distortion correction function.

5. The apparatus for testing an optical element claimed in claim 4, wherein the DVG is a 0.010" thick sheet of metal having an array of hexagonal holes.

6. The apparatus for testing an optical element claimed in claim 4, further comprising a kinematic mount for mounting the DVG in the optical test-set, whereby the DVG can be removed and replaced in exactly the same position in the optical-test set.

* * * * *